US007965608B2

(12) United States Patent
Hwang et al.

(10) Patent No.: US 7,965,608 B2
(45) Date of Patent: Jun. 21, 2011

(54) HOLOGRAPHIC STORAGE MEDIUM, AND APPARATUS FOR RECORDING/REPRODUCING DATA ON/FROM THE HOLOGRAPHIC STORAGE MEDIUM

(75) Inventors: Sung-hee Hwang, Suwon-si (KR); Jin-han Kim, Suwon-si (KR); Hyun-soo Park, Seoul (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 821 days.

(21) Appl. No.: 11/751,858

(22) Filed: May 22, 2007

(65) Prior Publication Data
US 2008/0165659 A1    Jul. 10, 2008

(30) Foreign Application Priority Data
Jan. 5, 2007   (KR) .................. 10-2007-0001705

(51) Int. Cl.
*G11B 7/00*   (2006.01)

(52) U.S. Cl. ....................................................... 369/103

(58) Field of Classification Search ................. None
See application file for complete search history.

(56) References Cited

U.S. PATENT DOCUMENTS

2002/0191236 A1* 12/2002 King .............................. 359/10
2003/0043150 A1   3/2003 Hwang
2003/0227658 A1* 12/2003 Thomas et al. ................ 359/35
2005/0063028 A1*  3/2005 Yasuda et al. .................. 359/3

FOREIGN PATENT DOCUMENTS
JP   2002-343028   11/2002
KR   10-588928     6/2006

OTHER PUBLICATIONS

International Search Report and Written Opinion issued in corresponding PCT International Application No. PCT/KR2007/005118 dated Jan. 25, 2008.

* cited by examiner

*Primary Examiner* — Hoa T Nguyen
*Assistant Examiner* — Emily Frank
(74) *Attorney, Agent, or Firm* — NSIP Law (57) ABSTRACT

A holographic storage medium, and a method and an apparatus for recording/reproducing data on/from the holographic storage medium, the method recording data on the holographic storage medium as holograms recorded in datapages, and dividing one of the datapages into a plurality of regions; and recording the data at various sampling rates in the respective regions.

20 Claims, 7 Drawing Sheets

HOLOGRAPHIC STORAGE MEDIUM, AND APPARATUS FOR RECORDING/REPRODUCING DATA ON/FROM THE HOLOGRAPHIC STORAGE MEDIUM

CROSS-REFERENCE TO RELATED APPLICATION

This application claims the benefit of Korean Patent Application No. 2007-1705, filed on Jan. 5, 2007, in the Korean Intellectual Property Office, the disclosure of which is incorporated herein by reference.

BACKGROUND OF THE INVENTION

1. Field of the Invention

Aspects of the present invention relate to a holographic storage medium, and a method and an apparatus for recording/reproducing data on/from the holographic storage medium.

2. Description of the Related Art

In optical holography, data is stored within the recording medium, and not on the surface, of the recording medium. Holograms are recorded using a signal beam and a reference beam which include data. The signal beam interferes with the reference beam in the recording medium, generating an interference pattern that is referred to as a datapage. A plurality of patterns are superimposed by changing the optical characteristics of the reference beam. This process is referred to as multiplexing. When reading data, a single reference beam is incident on the recording medium under the same conditions as in data recording, to generate a diffraction beam which displays the stored datapage. The diffraction beam is detected by a detection array. The detection array extracts stored data bits by measuring intensity patterns. The datapage includes a large number of data bits or pixels. Data storage capacity can be increased by superimposing more datapages in the same volume of the recording medium.

Figure 1A:
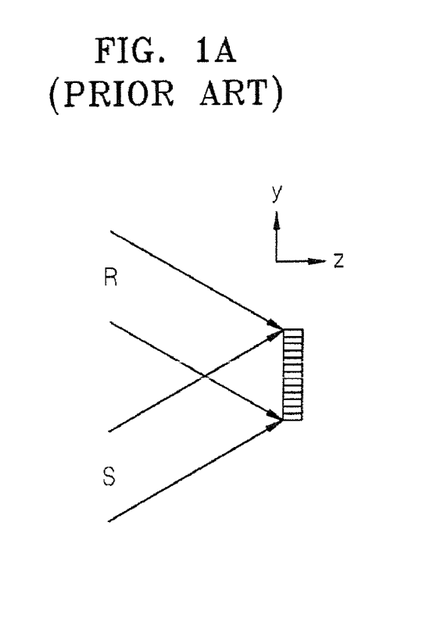
FIGS. 1A and 1B describe the recording and reproducing of data in optical holography.
Figure 1B:
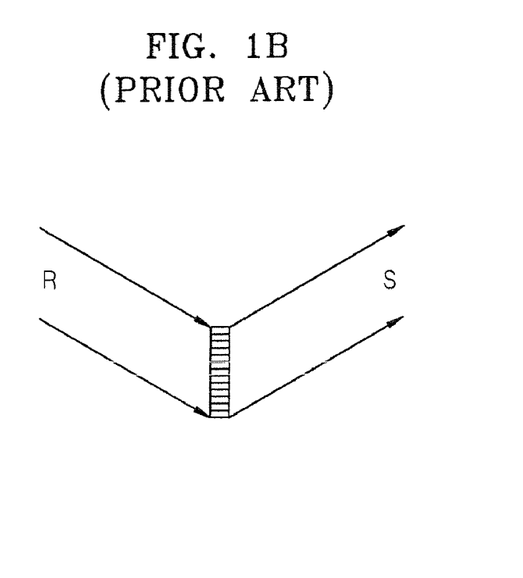

FIGS. 1A and 1B describe the recording and reproducing of data in optical holography. Referring to FIG. 1A, when recording data, a reference beam R and a signal beam S interfere with each other to generate an interference pattern on a storage medium. Referring to FIG. 1B, when reproducing data, the original reference beam R is applied to holograms stored in the storage medium to generate the output signal beam S by diffracting the recorded hologram.

Data is recorded on the holographic storage medium by interference between the signal beam S and the reference beam R. The signal beam S is generated by a spatial light modulator (SLM) in the form of a datapage including a plurality of pixels. The signal beam S passes through an optical system and interferes with the reference beam R in the storage medium. The interference pattern generated by the interference of the signal beam S and the reference beam R is recorded in the storage medium. If the reference beam R is applied to the recorded interference pattern, the recorded signal beam S is diffracted and reproduced.

Figure 2:
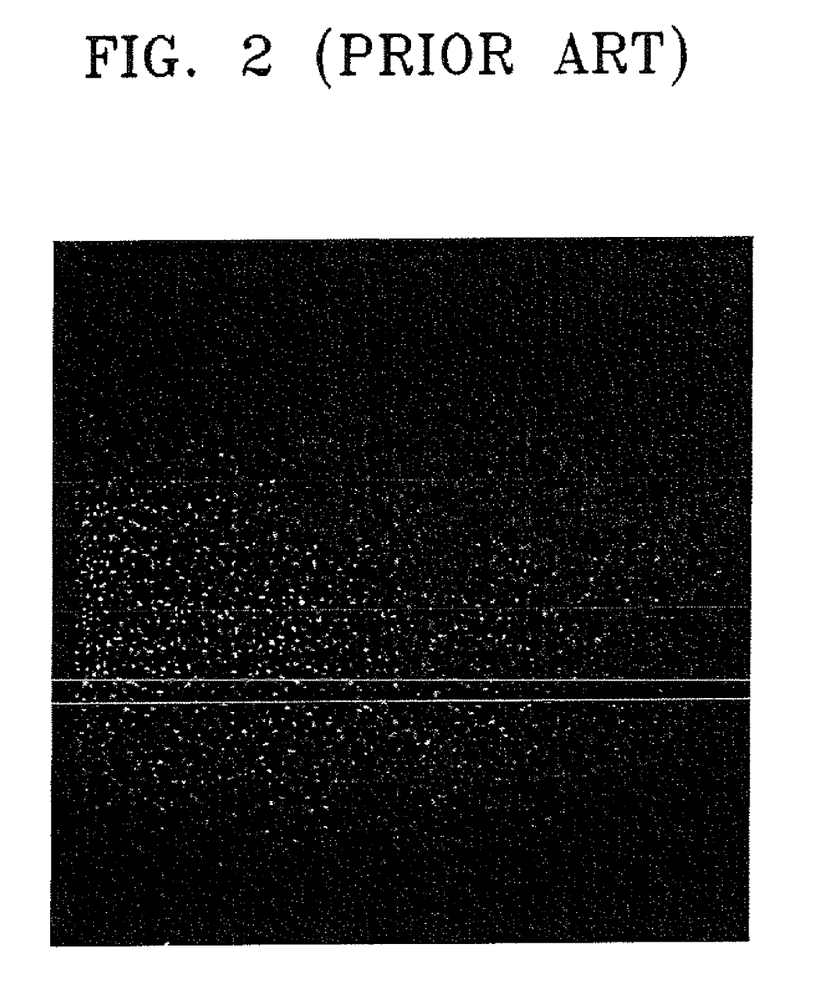
FIG. 2 is a reproduced image of a conventional apparatus for recording/reproducing holograms.

FIG. 2 is a reproduced image of a conventional apparatus for recording/reproducing holograms.

When recording holograms, the intensity and phase of a signal beam can be recorded using a method such as varying the angle of a reference beam. Hundreds or even thousands of hologram datapages can be recorded in the same position. A datapage contains information in the form of pixels turned on or off. The original data is modulated by adjusting the number of on or off pixels in one binary datapage while recording the data on a holographic storage medium.

The signal beam is modulated by an SLM or page composer (PC) and transferred to the holographic storage medium. Due to the formal characteristics of a lens, the light intensity in a central region of the lens is different from the light intensity in an edge region of the lens. In general, the intensity has a Gaussian distribution. The light intensity drops from the central region to the edge region of the SLM, and the intensity of an on-pixel also drops from the central region to the edge region of the datapage. Since an on-pixel transmits light and an off-pixel blocks light, theoretically, light has to be extracted only from the on-pixels. However, due to noise such as interference or crosstalk with an adjacent datapage, light can also be extracted from the off-pixels. Accordingly, the on-pixels in the edge region have lower intensity and definition than those in the central region. In other words, under the same conditions, the signal quality of data in an edge region is lower than that in a central region, as illustrated in FIG. 2, which reduces the reliability of the data.

SUMMARY OF THE INVENTION

According to an aspect of the present invention, there is provided a holographic storage medium, and a method and an apparatus for recording/reproducing data on/from the holographic storage medium in order to maintain the reproduction quality of a datapage signal constantly.

According to another aspect of the present invention, there is provided a holographic storage medium, and a method and an apparatus for recording/reproducing data on/from the holographic storage medium in order to improve the signal quality of a whole datapage.

According to an aspect of the present invention, there is provided a method of recording data on a holographic storage medium as holograms recorded in datapages, the method including dividing a datapage into a plurality of regions; and recording the data at various sampling rates in the respective regions.

According to another aspect of the present invention, the dividing of the datapage into a plurality of regions may be performed by dividing the datapage in accordance with the quality of reproduction signals.

According to another aspect of the present invention, the recording of the data at various sampling rates in the respective regions may be performed by recording the data at a low or first sampling rate in a region having a high quality or first reproduction signal and at a high or second sampling rate in a region having a low quality or second reproduction signal.

According to another aspect of the present invention, the region having the high or reproduction signal of first quality may be a central region of the datapage and the region having the low or reproduction signal of second quality may be an edge region of the datapage.

According to another aspect of the present invention, the datapage may be recorded on the holographic storage medium using a method of angle multiplexing, the quality of the reproduction signal may vary between regions divided by lines perpendicular to a scan direction of a reference beam, and the region having the high or reproduction signal of first quality may be a central region of the datapage with respect to the scan direction of the reference beam and the region having the low or reproduction signal of second quality may be an edge region of the datapage with respect to the scan direction of the reference beam.

According to another aspect of the present invention, the datapage may be recorded on the holographic storage medium using a method of shift multiplexing, the quality of the reproduction signal may vary in accordance with a degree of overlap of the datapage, and the region having the high or reproduction signal of first quality may be a region having a low degree of overlap of the datapage and the region having the low or reproduction signal of second quality may be a region having a high degree of overlap of the datapage.

According to another aspect of the present invention, there is provided a method of recording data on a holographic storage medium as holograms recorded in datapages, the method including dividing a datapage in accordance with a degree of reliability needed for the data to be recorded; and recording the data at a low or first sampling rate in a region containing data which needs high reliability and at a high or second sampling rate in a region containing data which needs lower reliability, wherein the first sampling rate is lower than the second sampling rate.

According to another aspect of the present invention, there is provided an apparatus for recording data on a holographic storage medium as holograms recorded in datapages, the apparatus including a light processing unit which records the data on the holographic storage medium using a signal beam and a reference beam; and a control unit which controls the light processing unit so as to divide a datapage into a plurality of regions and record the data at various sampling rates in the respective regions.

According to another aspect of the present invention, the control unit may divide the datapage in accordance with the quality of reproduction signals.

According to another aspect of the present invention, the control unit may record the data at a low sampling rate in a region having a high or reproduction signal of first quality and at a high sampling rate in a region having a low or reproduction signal of second quality.

According to another aspect of the present invention, the region having the high or reproduction signal of first quality may be a central region of the datapage and the region having the low or reproduction signal of second quality may be an edge region of the datapage.

According to another aspect of the present invention, the datapage may be recorded on the holographic storage medium using a method of angle multiplexing, the quality of the reproduction signal may vary between regions divided by lines perpendicular to a scan direction of a reference beam, and the region having the high or reproduction signal of first quality may be a central region of the datapage with respect to the scan direction of the reference beam and the region having the low or reproduction signal of second quality may be an edge region of the datapage with respect to the scan direction of the reference beam.

According to another aspect of the present invention, the datapage may be recorded on the holographic storage medium using a method of shift multiplexing, the quality of the reproduction signal may vary in accordance with a degree of overlap of the datapage, and the region having the high quality reproduction signal may be a region having a low degree of overlap of the datapage and the region having the low quality reproduction signal may be a region having a high degree of overlap of the datapage.

According to another aspect of the present invention, there is provided an apparatus for recording data on a holographic storage medium as holograms recorded in datapages, the apparatus including a light processing unit which records the data on the holographic storage medium using a signal beam and a reference beam; and a control unit which divides the datapage in accordance with a degree of reliability needed for the data to be recorded and records the data at a low sampling rate in a region containing data which needs high reliability and at a high sampling rate in a region containing data which needs lower reliability.

According to another aspect of the present invention, there is provided a holographic storage medium on which holograms are recorded in datapages, wherein a datapage is divided into a plurality of regions, and the data is recorded at various sampling rates in the respective regions.

According to another aspect of the present invention, the datapage may be divided in accordance with the quality of reproduction signals.

According to another aspect of the present invention, the data may be recorded at a low or first sampling rate in a region having a high or reproduction signal of first quality and at a high or second sampling rate in a region having a low or reproduction signal of second quality, wherein the first sampling rate is lower than the second sampling rate, and a quality of the reproduction signal of first quality is higher than a quality of the reproduction signal of second quality.

According to another aspect of the present invention, the region having the high quality reproduction signal may be a central region of the datapage and the region having the low quality reproduction signal may be an edge region of the datapage.

According to another aspect of the present invention, the datapage may be recorded on the holographic storage medium using a method of angle multiplexing, the quality of the reproduction signal may vary between regions divided by lines perpendicular to a scan direction of a reference beam, and the region having the high quality reproduction signal may be a central region of the datapage with respect to the scan direction of the reference beam and the region having the low quality reproduction signal may be an edge region of the datapage with respect to the scan direction of the reference beam.

According to another aspect of the present invention, the datapage may be recorded on the holographic storage medium using a method of shift multiplexing, the quality of the reproduction signal may vary in accordance with a degree of overlap of the datapage, and the region having the high quality reproduction signal may be a region having a low degree of overlap of the datapage and the region having the low quality reproduction signal may be a region having a high degree of overlap of the datapage.

According to another aspect of the present invention, there is provided a holographic storage medium on which holograms are recorded in datapages, wherein a datapage is divided in accordance with a degree of reliability needed for the data to be recorded and the data is recorded at a low sampling rate in a region containing data which needs high reliability and at a high sampling rate in a region containing data which needs lower reliability.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
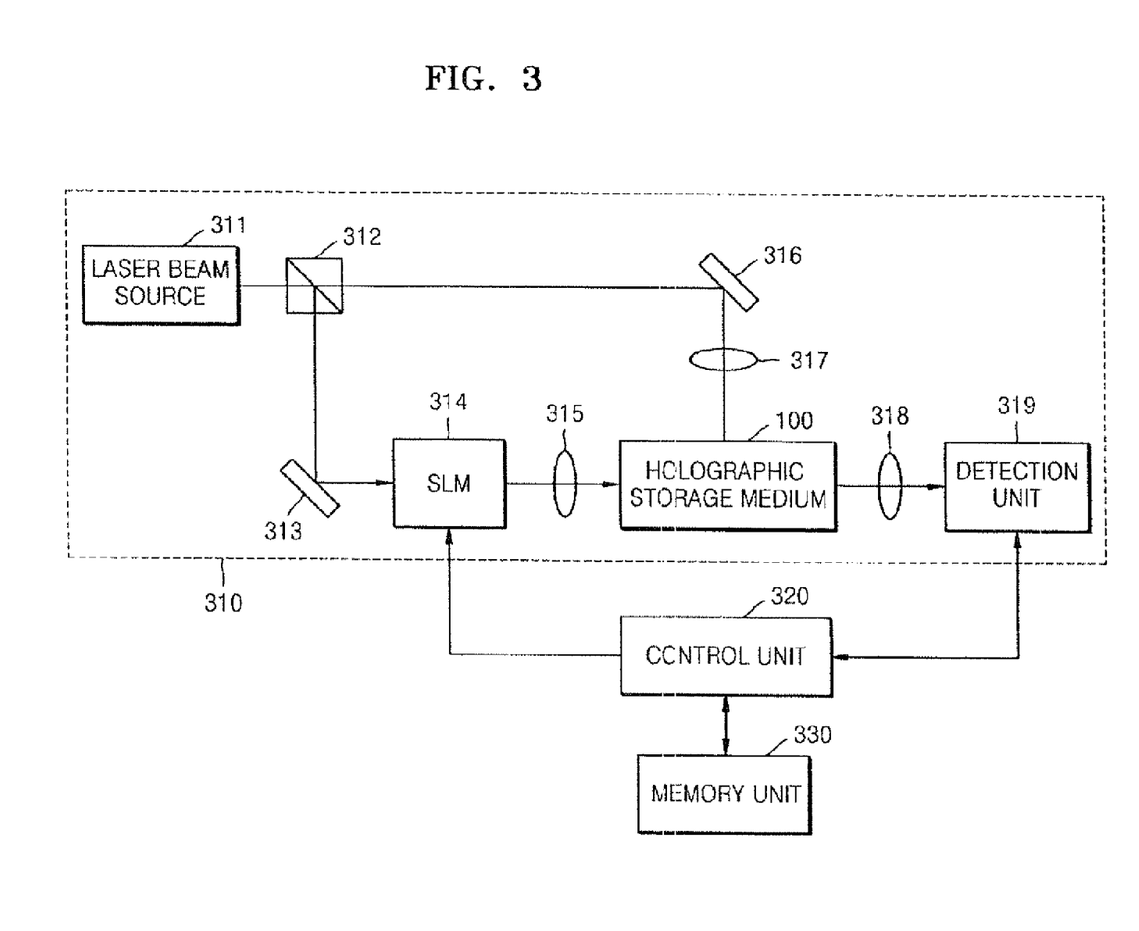
FIG. 3 is a diagram of an apparatus for recording/reproducing holograms according to an embodiment of the present invention.

FIG. 3 is a diagram of an apparatus for recording/reproducing holograms according to an embodiment of the present invention. Referring to FIG. 3, the apparatus for recording/reproducing holograms includes a light processing unit 310, a control unit 320, and a memory unit 330. The light processing unit 310 includes a holographic storage medium 100, the control unit 320 controls the light processing unit 310 so as to record data on the holographic storage medium 100 or reproduce the data from the holographic storage medium 100, and the memory unit 330 temporarily stores the data read from the holographic storage medium 100 or the data to be recorded on the holographic storage medium 100. The light processing unit 310 also includes a laser beam source 311, a beam splitter 312, a first mirror 313, a spatial light modulator (SLM) 314, a first lens 315, a second mirror 316, a second lens 317, a third lens 318 and a detection unit 319.

The control unit 390 controls the light processing unit 310, generates datapages containing the data, transmits the datapages to the light processing unit 310, and processes signals reproduced by the light processing unit 310. In particular, the control unit 320 according to an embodiment of the present invention divides each of the datapages recorded on the holographic storage medium 100 into a plurality of regions in accordance with the quality of reproduction signals, and controls the light processing unit 310 such that the data is recorded by varying the sampling rates of the respective regions.

The sampling rate indicates the degree of matching between pixels of raw data modulated by the SLM 314 and pixels of recorded data. When the data is recorded, the pixels of the raw data and the pixels of the recorded data are matched 1:1 or 1:n (n is a natural number greater than or equal to 2). Here, one pixel corresponds to 1 bit. In a region having a 1:1 sampling rate, one pixel of the raw data is recorded as one pixel of the recorded data. However, in a region having a 1:n sampling rate, one pixel of the raw data is recorded as $n^2$ pixels of the recorded data. For example, in a region having a 1:2 sampling rate, one on-pixel of the raw data is recorded to correspond to four on-pixels in a 2×2 array, and in a region having a 1:3 sampling rate, one on-pixel of the raw data is recorded to correspond to nine on-pixels in a 3×3 array. However, the correspondence of one pixel to $n^2$ pixels in the 1:n sampling rate is merely an example, and one pixel can also correspond to two, three or another number of pixels.

The control unit 320 controls the light processing unit 310 such that the data is recorded at a low sampling rate in a region having a high or reproduction signal of first quality, and at a high sampling rate in a region having a low or reproduction signal of second quality. For example, the region having a high or reproduction signal of first quality can have a 1:1 sampling rate and the region having a low or reproduction signal of second quality can have a 1:2 sampling rate. This increases the number of pixels in the region having the low or reproduction signal of second quality to four times, improving the quality of the reproduction signals and balancing signal quality.

When the data is recorded on the holographic storage medium 100, a laser beam is output from the laser beam source 311, then divided by the beam splitter 312 into a reference beam and a signal beam. The signal beam is incident on the SLM 314 which displays the recorded data and spatially amplitude-modulates the incident beam. The modulated signal beam is sampled and then concentrated into the holographic storage medium 100. Meanwhile, the reference beam is reflected by the second mirror 316 and directed onto the holographic storage medium 100 by the second lens 317. Accordingly, the superimposed signal beam and reference beam form an interference pattern, which is recorded as a precise pattern on the holographic storage medium 100.

When the data recorded on the holographic storage medium 100 is reproduced, a light beam identical to the reference beam that was used for recording is applied to the holographic storage medium 100, and the data is reproduced as a diffraction beam corresponding to the interference pattern recorded on the holographic storage medium 100. The diffraction beam is concentrated onto the detection unit 319 composed of a charge-coupled device (CCD) or a complementary metal-oxide-semiconductor (CMOS) device, by the third lens 318. The reproduction signal output from the detection unit 319 is transferred to the control unit 320.

In particular, according to an embodiment of the present invention, the light processing unit 310 reads the datapage from the holographic storage medium 100 and the control unit 320 distinguishes the datapage into a plurality of regions and processes the regions at various sampling rates in order to reproduce the data. The regions are distinguished in accordance with the quality of the reproduction signals. The region having a high or reproduction signal of first quality has a low sampling rate and the region having a low or reproduction signal of second quality has a high sampling rate. The control unit 320 distinguishes the regions having high or reproduction signals of first quality and the regions having low or reproduction signals of second quality, and processes the regions in accordance with their sampling rate.

Figure 4:
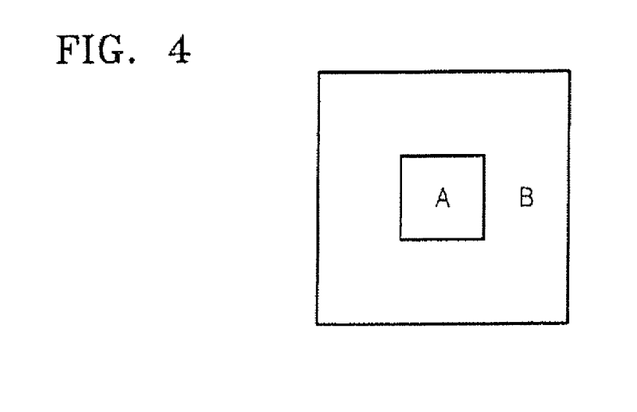
FIG. 4 shows a datapage divided into a plurality of regions according to an embodiment of the present invention.

FIG. 4 shows a datapage divided into a plurality of regions according to an embodiment of the present invention. A signal beam concentrated on a holographic storage medium has different light intensities in a central region and in an edge region of a lens due to the formal characteristics of the lens. The datapage of FIG. 4 is an example of when the datapage is divided into a central region A having a high or first signal quality and an edge region B having a low or second signal quality. Data is recorded at a low sampling rate in the region A, and at a high sampling rate in the region B.

Figure 5A:
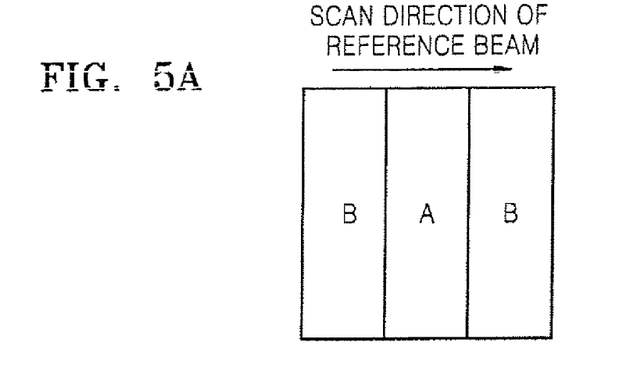
FIGS. 5A and 5B show datapages divided into a plurality of regions according to another embodiment of the present invention.
Figure 5B:
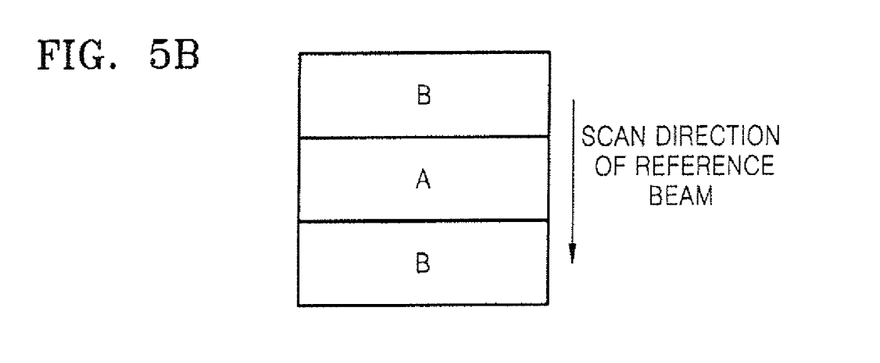

FIGS. 5A and 5B show datapages divided into a plurality of regions according to another embodiment of the present invention.

Various methods can be used to superimpose a plurality of datapages onto a holographic storage medium. One method is angle multiplexing, where the incident angle of the reference beam is changed for each datapage. Here, the angle of the reference beam is measured with respect to the center of the datapage, such that an edge region of the datapage has a low or second signal quality due to deviation of the angle.

Thus, the regions are divided by lines perpendicular to the scan direction of the reference beam. When the scan direction of the reference beam is horizontal, the datapage can be divided as in FIG. 5A, and when the scan direction of the reference beam is vertical, the datapage can be divided as in FIG. 5B. In FIGS. 5A and 5B, regions A have a high or reproduction signal of first quality and regions B have a low or reproduction signal of second quality. The data is recorded in the regions A at a low sampling rate and in the regions B at a high sampling rate. This prevents unbalance of signal quality between the regions A and B, by adjusting the sampling rate in accordance with the degree of unbalance.

Figure 6A:
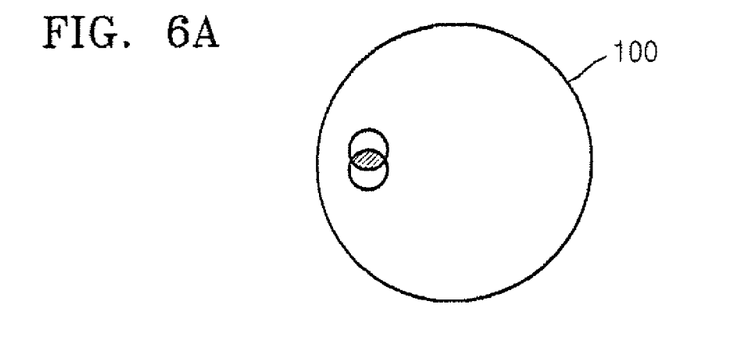
FIG. 6A illustrates a method of recording data using multiplexing according to another embodiment of the present invention.
Figure 6B:
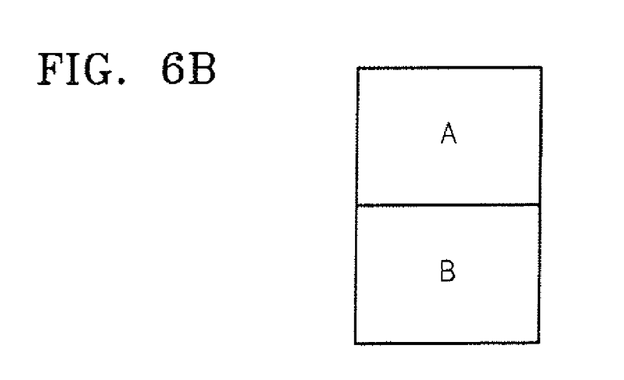
FIGS. 6B and 6C show datapages divided into a plurality of regions according to another embodiment of the present invention.
Figure 6C:
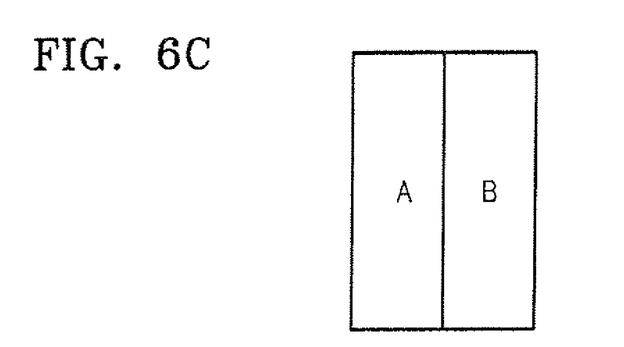

FIG. 6A illustrates a method of recording data using multiplexing according to another embodiment of the present invention. FIGS. 6B and 6C show datapages divided into a plurality of regions according to another embodiment of the present invention.

FIG. 6A illustrates a method of recording data on a holographic storage medium 100 using shift multiplexing, where the storage region is changed while shifting the position of the holographic storage medium 100 using a reference beam. If the data of a datapage is recorded by shifting the position of the holographic storage medium 100 as illustrated in FIG. 6A, the overlap of the datapages depends on the storage region. For example, if the holographic storage medium 100 is shifted to the right, the right region of the datapage is overlapped more.

Thus, the datapage is divided into a plurality of regions in accordance with the overlapping of the datapage and the data is recorded by varying the sampling rates of the respective regions.

The datapage of FIG. 6B is an example of the datapage when the data is recorded by shifting the holographic storage medium 100 towards the bottom of the drawing. A region B has a higher degree of overlapping than a region A, and thus a lower or second signal quality.

The datapage of FIG. 6C is an example of the datapage when the data is recorded by shifting the holographic storage medium 100 towards the right of the drawing. A region B has a higher degree of overlapping than a region A, and thus a lower signal quality.

Accordingly, to balance the signal quality, data is recorded at a low sampling rate in the regions A and at a high sampling rate in the regions B.

Figure 7:
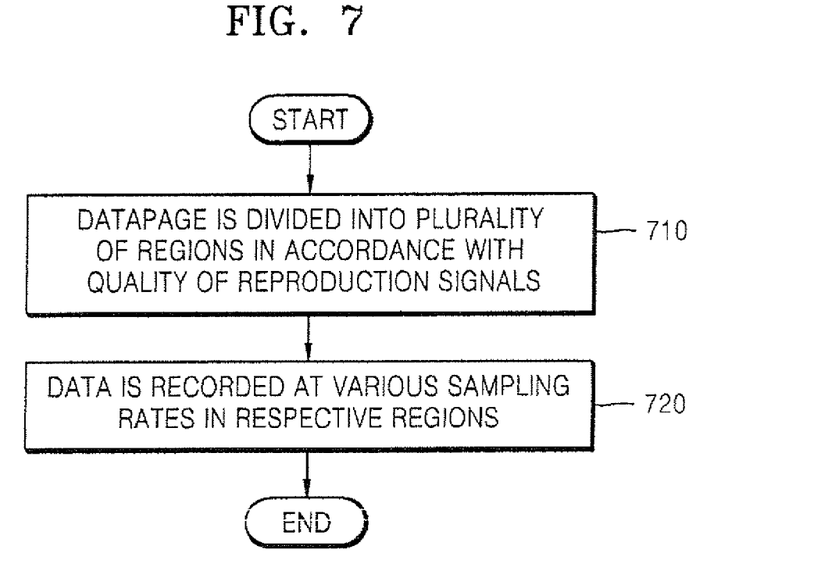
FIG. 7 is a flowchart of a method of recording data on a holographic storage medium according to an embodiment of the present invention.

FIG. 7 is a flowchart of a method of recording data on a holographic storage medium according to an embodiment of the present invention.

In operation 710, a datapage is divided into a plurality of regions in accordance with the quality of reproduction signals. The datapage can be divided in various ways, but is generally divided into a central region and an edge region. When the datapage is superimposed using angle multiplexing, the datapage is divided by lines normal to the scan direction of the reference beam, and when the datapage is superimposed using shift multiplexing, the datapage is divided according to degrees of overlapping of the datapage.

In operation 720, the data is recorded at varying sampling rates in the respective regions. The data is recorded at a low sampling rate in a region having a high or reproduction signal of first quality, and at a high sampling rate in a region having a low or reproduction signal of second quality. If the sampling rate of the regions having a low or reproduction signal of second quality is high, when the data is recorded, the number of pixels corresponding to one pixel is increased. Accordingly, the quality gap between regions having different quality reproduction signals is reduced. In general, a central region of the datapage has a higher quality reproduction signal than an edge region of the datapage. In angle multiplexing, a central region at which the angle of the reference beam is measured has a higher quality, and in shift multiplexing, regions having less overlapping have higher quality.

Figure 8:
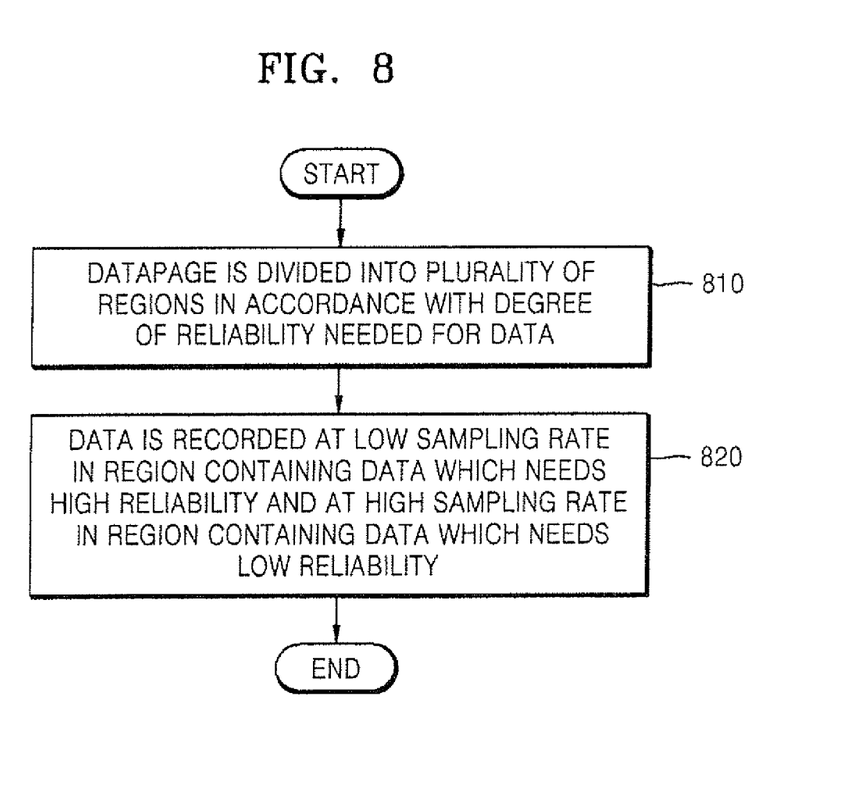
FIG. 8 is a flowchart of a method of recording data on a holographic storage medium according to another embodiment of the present invention.

FIG. 8 is a flowchart of a method of recording data on a holographic storage medium according to another embodiment of the present invention. In operation 810, a datapage is divided into a plurality of regions in accordance with reliability requirements of data to be recorded. For example, since data such as file system information or media management information is important for the holographic storage medium, such data requires high reliability, whereas data such as user information requires lower reliability. The datapage is divided into a region in which important data is recorded and a region in which less important data is recorded.

In operation 820, the data is recorded at a high sampling rate in the region which needs high reliability, and at a low sampling rate in the region which needs low reliability. If the data is recorded at a high sampling rate, the quality of a data signal can be improved such that important information which requires the high reliability can be stored reliably. For example, if the region in which the medium management information is recorded has a 1:2 sampling rate and the region in which the user information is recorded has a 1:1 sampling rate, the medium management information can be stored reliably.

Figure 9:
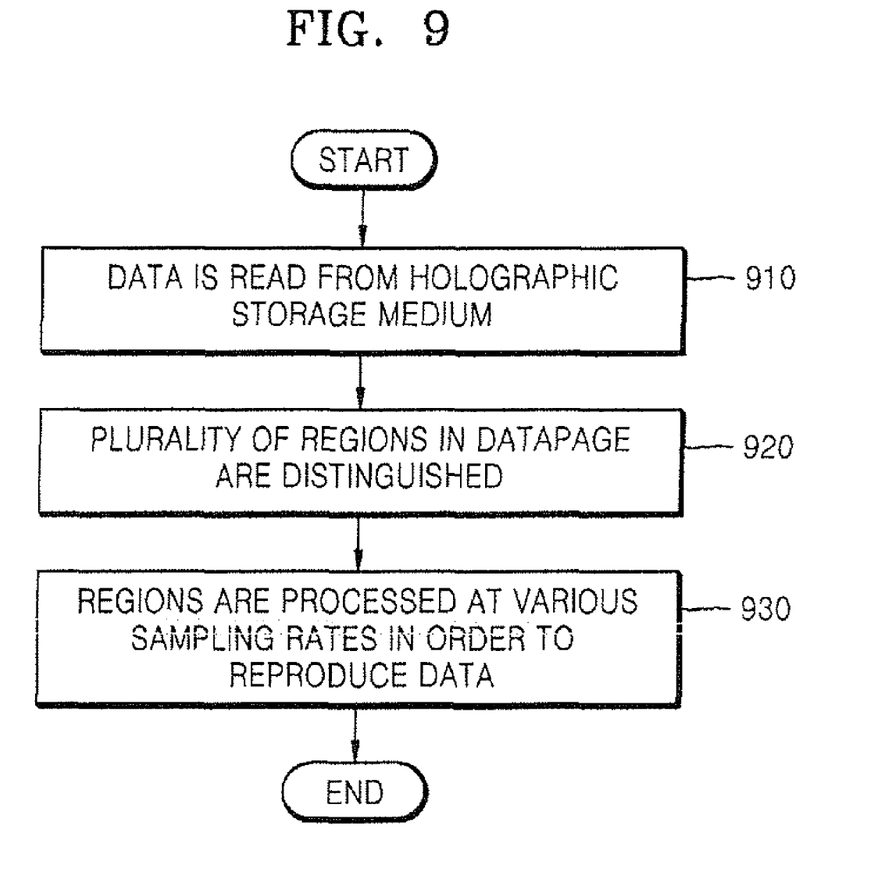
FIG. 9 is a flowchart of a method of reproducing data from a holographic storage medium according to an embodiment of the present invention.

FIG. 9 is a flowchart of a method of reproducing data from a holographic storage medium according to an embodiment of the present invention. In operation 910, a datapage is read from a holographic storage medium in which holograms are recorded in datapages. In operation 920, the datapage is divided into a plurality of regions. The control unit 320 of FIG. 3 records data at different sampling rates in the respective regions. In operation 930, each of the regions is processed at a different sampling rate in order to reproduce the data. The datapage is divided in accordance with the quality of reproduction signals or the reliability requirements of the data. The data is recorded at different sampling rates in the respective regions, and is processed at the corresponding sampling rates when reproduced.

As described above, the quality of a reproduction signal of a datapage can be maintained constantly and the signal quality of every portion of the datapage can be improved by recording data at various sampling rates in accordance with the quality of the reproduction signal.

Furthermore, the reliability of the data can be improved by recording data information at a high sampling rate.

The embodiments of the present invention can be written as computer programs and can be implemented in general-use digital computers that execute the programs using a computer readable recording medium. Examples of the computer readable recording medium include magnetic storage media (e.g. ROM, floppy disks, hard disks, etc.), optical recording media (e.g. CD-ROMs, or DVDs), and storage media such as carrier waves (e.g. transmission through the Internet).

While the present invention has been particularly shown and described with reference to exemplary embodiments thereof, it will be understood by those skilled in the art that various changes in form and detail may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of recording data on a holographic storage medium as holograms recorded in datapages, the method comprising:
    dividing a datapage of the datapages into a plurality of regions; and
    recording the data at various sampling rates in the respective regions,
    wherein the sampling rates indicate a degree of matching between pixels of raw data and pixels of recorded data.

2. The method of claim 1, wherein the dividing of the datapage into a plurality of regions comprises dividing the datapage in accordance with a quality of reproduction signals.

3. The method of claim 1, wherein the recording of the data at the various sampling rates in the respective regions comprises recording the data at a first sampling rate in a region having a reproduction signal of first quality and at a second sampling rate in a region having a reproduction signal of second quality,
    wherein the first sampling rate is lower than the second sampling rate, and
    wherein a quality of the reproduction signal of first quality is higher than a quality of the reproduction signal of second quality.

4. The method of claim 3, wherein the region having the reproduction signal of first quality includes a central region of the datapage, and
    wherein the region having the reproduction signal of second quality includes an edge region of the datapage.

5. The method of claim 3, wherein the datapage is recorded on the holographic storage medium using angle multiplexing,
    wherein the quality of the reproduction signal varies between regions divided by lines perpendicular to a scan direction of a reference beam,
    wherein the region having the reproduction signal of first quality includes a central region of the datapage with respect to the scan direction of the reference beam, and
    wherein the region having the reproduction signal of second quality includes an edge region of the datapage with respect to the scan direction of the reference beam.

6. The method of claim 3, wherein the datapage is recorded on the holographic storage medium using shift multiplexing,
    wherein the quality of the reproduction signal varies in accordance with a degree of overlap of the datapage,
    wherein the region having the reproduction signal of first quality includes a region having a low degree of overlap of the datapage, and
    wherein the region having the reproduction signal of second quality includes a region having a high degree of overlap of the datapage.

7. The method of claim 1, wherein the dividing of the datapage into a plurality of regions comprises dividing the datapage in accordance with a degree of reliability needed for the data to be recorded.

8. The method of claim 1, wherein the recording of the data at various sampling rates in the respective regions comprises recording the data at a first sampling rate in a region containing data which needs high reliability, and at a second sampling rate in a region containing data which needs lower reliability, the first sampling rate being lower than the second sampling rate.

9. An apparatus for recording data on a holographic storage medium as holograms recorded in datapages, the apparatus comprising:
    a light processing unit which records the data on the holographic storage medium using a signal beam and a reference beam; and
    a control unit which controls the light processing unit so as to divide a datapage of the datapages into a plurality of regions and record the data at various sampling rates in the respective regions,
    wherein the sampling rates indicate a degree of matching between pixels of raw data and pixels of recorded data.

10. The apparatus of claim 9, wherein the control unit divides the datapage in accordance with a quality of reproduction signals.

11. The apparatus of claim 10, wherein the control unit records the data at a first sampling rate in a region having a reproduction signal of first quality and at a second sampling rate in a region having a reproduction signal of second quality,
    wherein the first sampling rate is lower than the second sampling rate, and
    wherein a quality of the reproduction signal of first quality is higher than a quality of the reproduction signal of second quality.

12. The apparatus of claim 11, wherein the region having the reproduction signal of first quality comprises a central region of the datapage, and
    wherein the region having the reproduction signal of second quality comprises an edge region of the datapage.

13. The apparatus of claim 11, wherein the datapage is recorded on the holographic storage medium using angle multiplexing,
    wherein the quality of the reproduction signal varies between regions divided by lines perpendicular to a scan direction of a reference beam,
    wherein the region having the reproduction signal of first quality comprises a central region of the datapage with respect to the scan direction of the reference beam, and
    wherein the region having the reproduction signal of second quality comprises an edge region of the datapage with respect to the scan direction of the reference beam.

14. The apparatus of claim 11, wherein the datapage is recorded on the holographic storage medium using shift multiplexing,
    wherein the quality of the reproduction signal varies in accordance with a degree of overlap of the datapage,
    wherein the region having the reproduction signal of first quality comprises a region having a low degree of overlap of the datapage, and
    wherein the region having the reproduction signal of second quality comprises a region having a high degree of overlap of the datapage.

15. The apparatus of claim 9, wherein the control unit divides the datapage in accordance with a degree of reliability needed for the data to be recorded.

16. The apparatus of claim 15, wherein the control unit records the data at a first sampling rate in a region containing data which needs a first type of reliability and at a second sampling rate in a region containing data which needs a second type of reliability, and wherein the first sampling rate is lower than the second sampling rate and the first reliability is of a higher type than the second reliability.

17. A method of reproducing data from a holographic storage medium in which holograms are recorded in datapages, the method comprising:

reading the data from the holographic storage medium;

distinguishing a plurality of regions in the datapages; and processing the respective regions at various sampling rates in order to reproduce the data, wherein the sampling rates indicate a degree of matching between pixels of raw data and pixels of recorded data.

18. The method of claim 17, wherein the regions are divided in accordance with the quality of reproduction signals, wherein a region having a reproduction signal of first quality has a first sampling rate while a region having a reproduction signal of second quality has a second sampling rate, and wherein the first sampling rate is lower than the second sampling rate.

19. An apparatus for reproducing data from a holographic storage medium in which holograms are recorded in datapages, the apparatus comprising:

a light processing unit which reads the data from the holographic storage medium; and a control unit which distinguishes a plurality of regions in each of the datapages and processes the respective regions at various sampling rates in order to reproduce the data, wherein the sampling rates indicate a degree of matching between pixels of raw data and pixels of recorded data.

20. The apparatus of claim 19, wherein the regions are divided in accordance with the quality of reproduction signals, wherein a region having a reproduction signal of first quality has a first sampling rate while a region having a reproduction signal of second quality has a second sampling rate, and wherein the first sampling rate is lower than the second sampling rate.

* * * * *